Sept. 15, 1959   G. H. SCOTT   2,903,937
MUSICAL TIME INDICATOR
Filed July 3, 1957

INVENTOR.
George H. Scott
BY Victor J. Evans & Co.
ATTORNEYS

2,903,937
MUSICAL TIME INDICATOR
George H. Scott, Glen Cove, N.Y.

Application July 3, 1957, Serial No. 669,858

2 Claims. (Cl. 84—484)

This invention relates to a device for use in teaching persons timing or rhythm, as for example during the teaching of music.

The object of the invention is to provide a musical time indicator which is adapted to be used for teaching a music student various rhythmic patterns or timing, and wherein the indicator of the present invention includes a manually operable member that is rotated whereby the student or pupil will be able to hear a sound that corresponds to the desired beat or timing of the music, and at the same time the student will be able to see and feel when the rotating member engages tabs which have been moved to a predetermined position.

A further object of the invention is to provide a musical time indicator which is extremely simple and inexpensive to manufacture.

Other objects and advantages will be apparent during the course of the following description.

In the accompanying drawings, forming a part of this application, and in which like numerals are used to designate like parts throughout the same.

Figure 2:
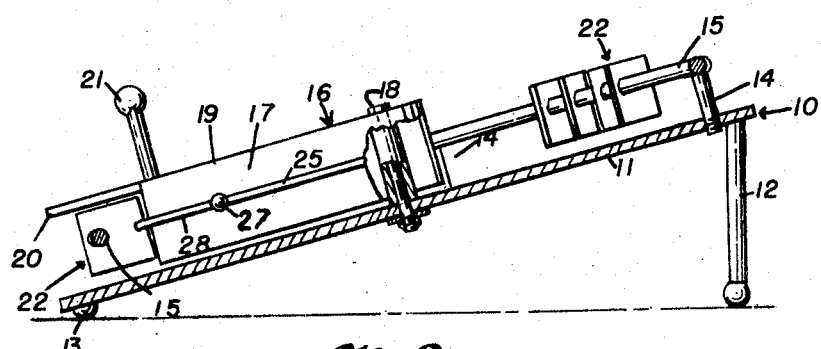
Figure 2 is a sectional view taken on the line 2—2 of Figure 1.

Referring in detail to the drawings, the numeral 10 indicates the musical time indicator of the present invention, and the indicator includes an inclined base which is indicated by the numeral 11. The rear portion of the base 11 is maintained in a raised position by means of legs 12, Figure 2. Resilient bushings 13 may be secured beneath the lower front portion of the base 11.

Extending upwardly from the base 11 and secured thereto is a plurality of spaced parallel pins or support members 14, and a circular ring member 15 is secured to the upper ends of the support members 14 in any suitable manner.

There is further provided a movable or rotary body member which is indicated generally by the numeral 16, and the body member 16 includes a pair of spaced parallel side walls 17. The body member 16 further includes a top wall 19, and a pivot pin or bolt 18 extends through the body member 16 for pivotally connecting the body member 16 to the base 11.

The outer or free end of the body member 16 is shaped to provide a flange 20 which has the shape of an arrow or point, and extending upwardly from the body member 16 and secured thereto is a handle 21 which is adapted to be used for manually rotating the body member 16.

Figure 3:
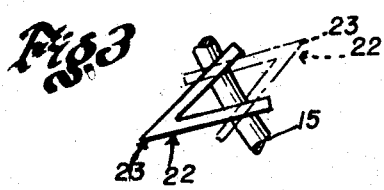
Figure 3 is a fragmentary sectional view showing one of the tabs mounted on the ring member.

Movably mounted on the ring 15 is a plurality of V-shaped tabs which are each indicated generally by the numeral 22. Each tab 22 includes an apex 23, and the tabs 22 can be arranged in the solid line position shown in Figure 3, or else these tabs can be moved so that they occupy the broken line position shown in Figure 3. Suitable indicia or markings such as indicated by the numeral 24, is adapted to be arranged on the base 11 adjacent to the tabs 22, for a purpose to be later described.

Figure 1:
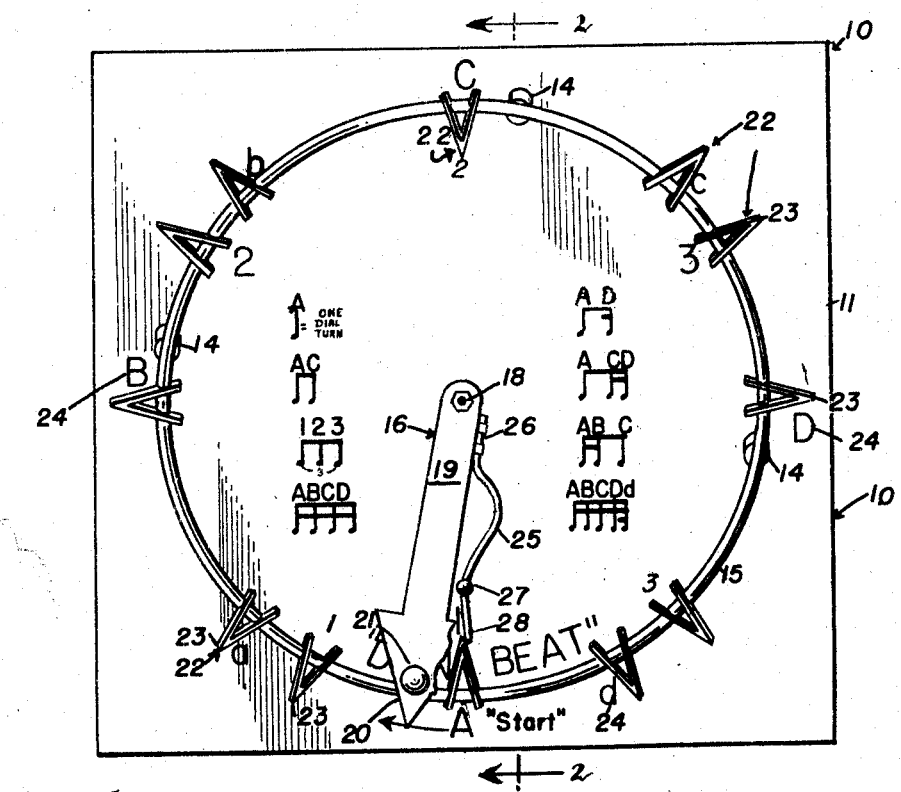
Figure 1 is a plan view showing the musical time indicator, constructed according to the present invention.

There is further provided a spring member 25 which has one end connected to a side wall 17 of the body member 16 by suitable securing elements 26, Figure 1. A hammer or knob 27 is connected to the spring member 25, and the hammer 27 is mounted for movement into and out of engagement with the adjacent side wall 17 of the body member 16. Extending outwardly from the spring member 25 is a contact member or contact piece 28 which is adapted to engage the apex 23 of the tab 22, when any of the tabs 22 are in the inward position such as shown in broken lines in Figure 3 whereby the hammer 27 will be caused to move into and out of engagement with the side wall 17 of the body member 16.

From the foregoing, it is apparent that there has been provided a musical time indicator which is especially suitable for use in teaching music students rhythmic patterns or timing. It is to be noted from the drawings, that there are a plurality of the tabs 22 of V-shape, and the tabs 2 are mounted on the ring member 15. As shown in Figure 1, two of the tabs 22 are arranged so that their apex 23 is positioned inwardly.

In Figure 1, there was illustrated the dial markings that are printed or otherwise arranged on the face of the device as an aid to the student.

The tabs A—C give exact division of the beat-note into two equal parts or two-eighth notes in duple meter division. Tabs A, B, C, D show a division of the beat-note into four equal parts or sixteenth notes in duple division. Tabs 1, 2, 3 show the division of the beat-note into three equal parts. The small numbers show the division of the beat-note in sixths. The dial markings on the face plate of the invention simplifies the learning process for the student.

All rhythmic figures will have the tab markings written above the music notation and the suggested counting time numbers under the music notation in the music method or work book that will be used with the present invention.

The student merely engages the tabs marked above the notation and learns by the process of imitation or rote. He learns to associate the musical notation with the sense of touch (feel the beat), and sound (hear the beat) and sight (see the beat) and its many division points within the beat-note, as he dials the desired music patterns to be learned.

Referring to the dial markings printed on the face, the capital letters indicate the division point (of one beat) in fourths, i.e. A to B one-quarter, A to C one-half, A to D three-quarters, A to A one full beat or one full dial turn. The small letters indicate division points in eighths.

In triple meter division, the large numbers indicate division points in thirds, the small numbers indicate division points in sixths.

The hoop or ring (360° circle) represents one foot division points based on twelve inches within the circular foot. The best can be broken or divided into any known rhythmic combinations. The dial markings simplify the course of study for the student. All division points and rhythmic patterns will be marked in the method book that will be used with the invention.

The legs 12 maintain the rear portion of the base 11 in raised position, and the pivot member 18 may be a bolt and nut assembly.

The tabs 22 may have different forms or shapes, and the parts can be made of different material and in different shapes or sizes. The handle 21 is provided for manually turning or rotating the body member 16. The rubber bumpers or bushings 13 help steady the device, and when the body member 16 is rotated in a clockwise direction, Figure 1, the hammer 27 will hit or strike the side of the body member 16. The body member 16 is hollow whereby the desired sound will be produced by the hammer striking the body member. The rubber bumpers 13 prevent the device from accidentally sliding or moving, and the pins or support members 14 maintain the ring member 15 at the desired elevation. When the body member 16 is turned, the contact point 28 brushes against the apex 23 of the tab 22 which is turned inwardly so as to cause a rapping sound to be produced whereby the student can feel this contact. The markings or indicia 25 may include letters and numerals, as for example as shown in Figure 1, and such markings may correspond to musical notations.

In use, the tabs 22 are moved to the desired letters 24 on the dial or base 11 and these tabs 22 are then slipped to the inside of the hoop or ring member 15, corresponding to the rhythm pattern to be learned. Then, the handle 21 is grasped and the body member 16 is turned in a clockwise direction in a steady manner whereby the contact point 28 will brush the tabs to cause a rapping sound which is similar to the rhythm of a drum.

Heretofore, music teachers have told their pupils to go home and practice until they get the feel of it, and the present invention is adapted to aid and assist the student develop an exact feeling for the musical beat or count and it is to be used as an aid in the various teaching methods which are now employed in teaching counting time which is essential in reading music notations from the printed page.

The student supplies the manpower so that he learns to feel, see and hear the length of note values. Also, his or her participation in the action required to turn the handle steadily on the dial front will contribute greatly toward the solution of his rhythmic problems by developing his sense of touch, sight and sound, and the device is constructed and intended for the pupil. Many timekeeping devices which are in use at the present time are mechanical and are so expensive as to be far above the financial reach or range of the average student, but the present invention is in the form of a hand metronome or physical musical measuring device and it is simple enough for the average amateur music student to operate, afford and understand. Many mechanical metronomes merely give the beat and this makes it possible for the pupil to feel what happens within the beat.

While I have shown a preferred form of my invention, I reserve all rights to such modifications as properly fall within the scope of the invention as claimed.

I claim:

1. In a musical time indicator, an inclined base having a rear portion and a lower front portion, legs depending from the rear portion of said base, resilient bushings mounted below the lower front portion of said base, a plurality of spaced parallel support members extending upwardly from said base and secured thereto, a ring member arranged parallel to said base and said ring member being secured to the upper ends of said support members, a movable body member having one end pivotally connected to said base, said body member including spaced parallel side walls and a top wall, a flange extending from the outer end of said body member and having the shape of an arrow, a handle extending upwardly from said flange, a spring member having one end connected to a side wall of said body member, a hammer mounted on said spring member, and said hammer being mounted for movement into and out of engagement with the side wall of said body member, a contact member on the outer end of said spring member, and a plurality of spaced apart V-shaped tabs movably mounted on said ring member, said tabs being mounted for movement into and out of the space within the orbit of said ring member whereby when the tabs are arranged so that they have their apices within the ring member, the contact member will engage the tabs as the body member is rotated by means of the handle.

2. In a musical time indicator, an inclined base having a rear portion and a lower front portion, legs depending from the rear portion of said base, resilient bushings mounted below the lower front portion of said base, a plurality of spaced parallel support members extending upwardly from said base and secured thereto, a ring member arranged parallel to said base and said ring member being secured to the upper ends of said support members, a movable body member having one end pivotally connected to said base, a handle extending upwardly from said body member, a spring member having one end connected to said body member, a hammer mounted on said spring member, and said hammer being mounted for movement into and out of engagement with said body member, a contact member on the outer end of said spring member, and a plurality of spaced apart V-shaped tabs movably mounted on said ring member, said tabs being mounted for movement into and out of the space within the orbit of said ring member whereby when the tabs are arranged so that they have their apices within the ring member, the contact member will engage the tabs as the body member is rotated by means of the handle, and indicia arranged on said base adjacent said tabs.

References Cited in the file of this patent

UNITED STATES PATENTS

| | | |
|---|---|---|
| 523,545 | O'Carroll | July 24, 1894 |
| 1,790,278 | Miessner | Jan. 27, 1931 |
| 2,386,624 | McGowan | Oct. 9, 1945 |

FOREIGN PATENTS

| | | |
|---|---|---|
| 664,091 | Great Britain | Jan. 2, 1952 |